Jan. 4, 1949.    H. M. UNSCHULD    2,458,321
FLOW TUBE
Filed March 29, 1946
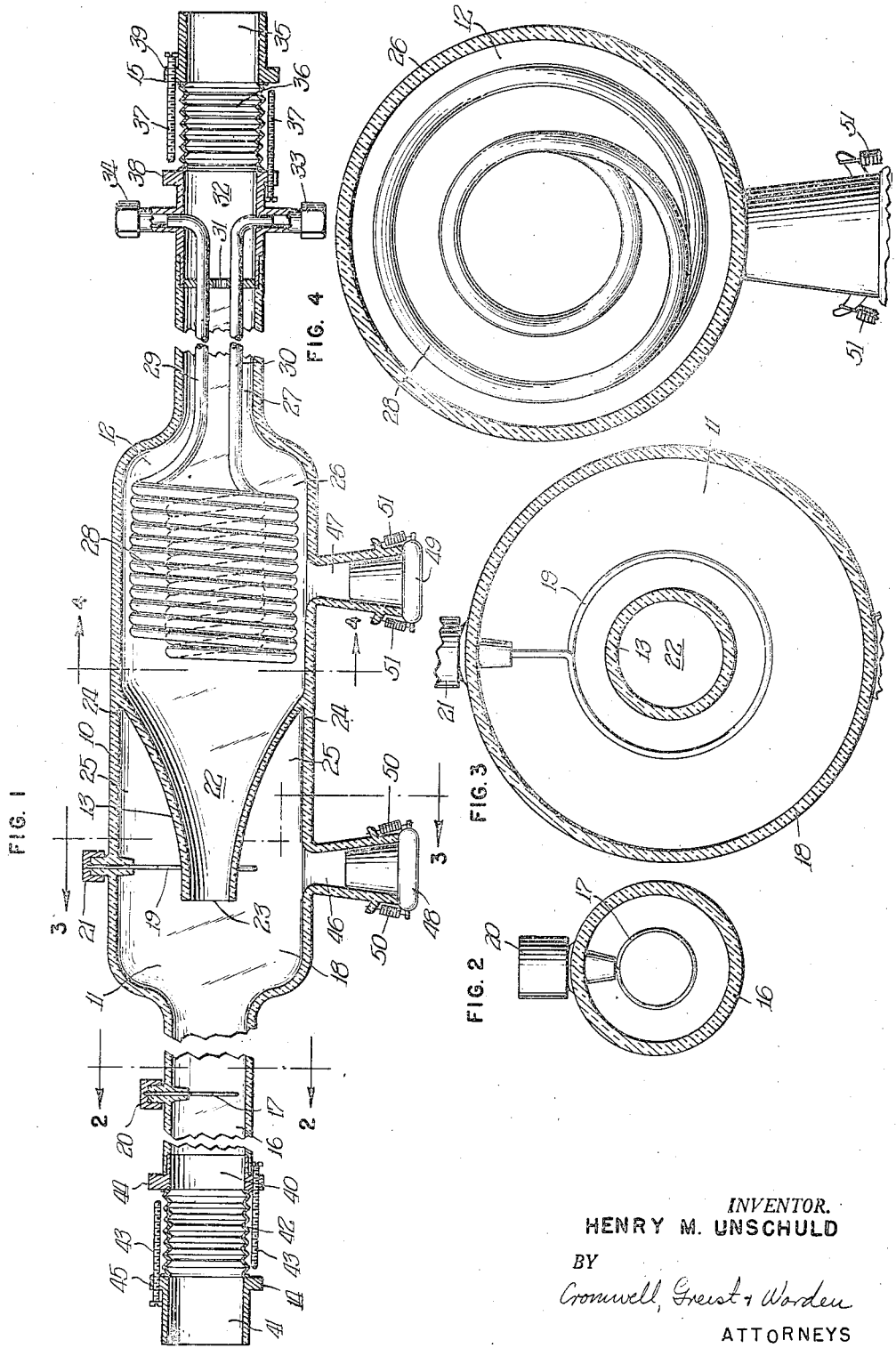
INVENTOR.
HENRY M. UNSCHULD
BY
Cromwell, Greist & Worden
ATTORNEYS Patented Jan. 4, 1949

2,458,321

UNITED STATES PATENT OFFICE 2,458,321

FLOW TUBE

Henry M. Unschuld, Chicago, Ill.

Application March 29, 1946, Serial No. 658,362

5 Claims. (Cl. 204—312)

My invention is concerned with improvements in a flow tube particularly adapted for treating fluids, such as a gas, to the bombarding action of electrostatic current.

It is an object of my invention to provide a flow tube having a treating chamber and a cooling chamber separated by an apertured partition which is so arranged that it retards the flow of the liquid in the treating chamber and thereby increases the period during which the fluid is subject to electrical bombardment.

It is another object of my invention to provide an elongated flow tube having axially aligned treating and cooling chambers, a restrictive passageway separating the chambers, axially spaced electrodes in the treating chamber and temperature control means in the cooling chamber wherein the restrictive passageway extends from the cooling chamber into the treating chamber to a point between the electrodes and wherein the chambers are each provided with a drainage aperture for cleaning and removing any liquids or solids therefrom.

It is a further object of my invention to provide an elongated flow tube for treating fluids with electrical charges having connecting means at the ends of the tube for attachment to a source of fluid supply and to a vacuum line wherein means is provided for absorbing any vibration set up in the tube and thus preventing breakage of the tube.

These and other objects will be apparent from a description of the preferred form of my flow tube which is shown by way of illustration in the accompanying drawings, wherein:

Fig. 1 is a longitudinal section on the center line of the tube with portions broken away as indicated;

Fig. 2 is a section on the line 2—2 of Fig. 1;

Fig. 3 is a section on the line 3—3 of Fig. 1; and

Fig. 4 is a section on the line 4—4 of Fig. 1.

As illustrated in the drawings my flow tube 10 comprises primarily a treating chamber 11, a cooling chamber 12, an apertured partition 13, near the center of the tube 10, separating the chambers 11 and 12, coupling members 14 at the entrance end of the tube 10 for connecting the tube 10 to a fluid supply line and coupling members 15 at the discharge end for connecting the tube 10 to a vacuum line.

The treating chamber 11, to which the fluid to be treated is admitted through the coupling 14, is formed by a tubular section 16 in which a ring electrode 17 is mounted. The section 16 merges into an enlarged tubular section 18 near the center of the tube 10. A similar electrode 19 is positioned in the section 18. The electrodes 17 and 19 are provided with exterior connector elements 20 and 21 adapted to be connected to a source of electrical current.

The central partition 13 is conical shaped and provides a restricted passageway 22 between the chambers 11 and 12. The cross section of the passageway is smallest at the rear or entrance end 23. The outwardly flaring walls which constitute the partition 13 extend from the aperture or end 23 which is located between the axially spaced electrodes 17 and 19 to the forward end 24 of the chamber 11 which is some distance beyond the electrode 19. The entrance end 23 of the passageway 22 is considerably smaller in diameter than the section 18 of the chamber 11. This arrangement provides an eddy zone 25 between the electrode 19 and the end 24 of the chamber 11. The effect of this construction is to slow down the passage of the fluid from the treating chamber 11 and to cause at least a portion of the fluid to be directed back into the path of the electrostatic discharge where it is subject to further bombardment.

The cooling chamber 12 is formed by an enlarged section 26 at the center of the tube 10 and a constructed section 27 which extends to the coupling 15 at the discharge end of the device. A coil 28 of copper tubing or the like, is provided in the central section 26 of the chamber 12 with its ends 29, 30 extending through the section 27. An apertured supporting partition or arbor 31 is provided to receive the ends 29, 30 and support the coil in spaced relation to the walls of the tube section 26.

The apertured partition 31 is mounted in the inner or rear end member 32 of the tubular coupling 15. The coupling member 32 is permanently connected to the end of the tube section 27. Connecting members 33, 34 are provided on the coupling member 32 for exteriorly connecting the coil ends 29, 30 to a source of low temperature cooling fluids. The coupling 15 includes an outer member 35 for connection with a vacuum line. A bellows member 36 extends between coupling members 32 and 35 and spaced adjusting screws 37 are provided in the flanges 38 and 39 on the members 32 and 35, respectively.

The coupling 14 at the receiving end of the tube 10 is similar to coupling 15 and is provided with an inner member 40, an outer member 41 and a connecting bellows 42. Spaced adjusting screws 43 are provided in the flanges 44 and 45 on the members 40 and 41. The coupling member 40 is permanently connected to the end of the tube section 16. The coupling member 41 is adapted to be connected to the line supplying the fluid to be treated by the device. The bellows members 36 and 42 prevent breakage of the tube which could otherwise result from vibration occurring during the operation of the same.

The chambers 11 and 12 are provided with draw-offs 46 and 47. Stopper members 48 and 49 are provided for the drainage openings and are normally held therein by openings or catch members 50 and 51. The openings 46 and 47 permit the cleaning of the chambers 11 and 12 when there is any deposit of sediment or the like to be removed therefrom. The openings 46 and 47 may be connected to conduits (not shown in the drawings) to permit continuous or intermittent withdrawal of accumulations in the tube.

My improved flow tube is used in the treatment of a fluid such as a gas for various purposes by ionization under electrical bombardment. The gas or other fluid is admitted to the chamber 11, generally at above normal temperature, and passes through the section 16 of the tube between the electrodes 17 and 19 where it is subject to electrical bombardment whereby the molecules of the fluid are split or dissociated and the fluid is converted into different products after which it is immediately cooled to stop further reaction of the molecules. The fluid moves through the passageway 22 into chamber 12 and thence through the tube section 27 to the discharge end of the tube. With my improved tube the nature of the potential supplying the electrodes may be controlled and the temperature at which the ionization operation is carried out may also be regulated to produce the most favorable conditions and secure the degree or type ionization desired.

I claim:

1. In an elongated flow tube, axially aligned chambers, a pair of spaced axially aligned electrodes in the first one of said chambers, temperature controlling means in the second one of said chambers, converging partition walls separating said chambers, said partition walls extending from said second chamber into said first chamber to a point between said electrodes and forming a restricted passageway between said chambers, means for connecting said tube to a fluid supply line to supply fluid to the said first chamber, and means for connecting said tube to a fluid discharge line to receive fluid from said second chamber, said connecting means including bellows type shock absorbing members.

2. In an elongated flow tube, for treating fluids with an electrical discharge, a treatment chamber provided with a pair of axially spaced electrodes and an inlet passage for the fluid being treated, a cooling chamber provided with a fluid cooling system and an outlet passage for the treated fluid, and a partition between said chambers having converging walls extending into said treating chamber to a point between said spaced electrodes and terminating in a restricted opening, each of said chambers having a drainage outlet independent of said inlet and outlet passages.

3. A flow tube comprising axially aligned chambers, a generally conical partition separating said chambers and providing a restricted opening between said chambers, means for connecting one end of said tube to a fluid source, axially spaced electrodes in the chamber adjacent said end of the tube, one of said electrodes surrounding the small end of said conical partition whereby the restricted opening between said chambers is positioned between said electrodes and said partition walls diverge toward the other of said chambers, a fluid cooling means in said other chamber for controlling the temperature of the fluid as it leaves the first mentioned chamber, means for connecting said cooling chamber to a vacuum means for controlling the pressure of said fluid in the tube, and means providing drainage outlets for each of said chambers, said drainage outlet means having removable closure members.

4. In an elongated flow tube, for treating fluids with an electrical discharge, a treatment chamber provided with a pair of aligned axially spaced ring electrodes, a cooling chamber provided with a fluid cooling system adjoining said treatment chamber, a partition between said chambers having converging walls extending into said treating chamber and through one of said ring electrodes to a point between said electrodes, said partition walls terminating in a restricted opening, means for connecting said treatment chamber to a fluid supply line, and means for connecting said cooling chamber to a fluid discharge line, said connecting means having contractible portions providing vibration absorbing means.

5. A flow tube comprising two axially aligned central chambers, a generally conical partition separating said chambers, said conical partition extending from one chamber into the other chamber and having an aperture in the small end thereof providing a restricted opening between said chambers, means for connecting one end of said tube to a fluid source including a constricted passageway, a pair of axially spaced ring electrodes, one of said electrodes being positioned in the passageway in said end of the tube, the other one of said electrodes being positioned in the adjacent chamber surrounding the small end of said conical partition whereby the restricted opening between said chambers is positioned between said electrodes and said partition walls diverge toward the other of said chambers, said passageway at said end of the tube including a shock absorbing bellows member, a fluid cooling means in the other central chamber for controlling the temperature of the fluid after it passes between said chambers, means including a constricted passageway for connecting said cooling chamber to a vacuum producing means for controlling the pressure of said fluid in the tube, said last mentioned passageway including a shock absorbing bellows member, and means providing drainage outlets for said central chambers having removable closure members.

HENRY M. UNSCHULD.

REFERENCES CITED

The following references are of record in the file of this patent:

UNITED STATES PATENTS

| Number | Name | Date |
|---|---|---|
| 1,035,873 | Grohmann | Aug. 20, 1912 |
| 1,055,331 | Kochmann | Mar. 11, 1913 |
| 1,115,625 | Koch | Nov. 3, 1914 |
| 1,895,489 | Ruben | Jan. 31, 1933 |
| 2,106,779 | Whittier | Feb. 1, 1938 |
| 2,106,782 | Whittier | Feb. 1, 1938 |

FOREIGN PATENTS

| Number | Country | Date |
|---|---|---|
| 169,548 | Great Britain | Oct. 6, 1921 |